US012804222B2

(12) United States Patent
Wang et al.

(10) Patent No.: US 12,804,222 B2
(45) Date of Patent: Nov. 17, 2026

(54) METHOD AND APPARATUS FOR INTERACTION IN LIVE-STREAMING ROOM, AND DEVICE AND MEDIUM

(71) Applicant: BEIJING ZITIAO NETWORK TECHNOLOGY CO., LTD., Beijing (CN)

(72) Inventors: Xiao Wang, Beijing (CN); Tiantian Zhang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/875,690

(22) PCT Filed: Jun. 28, 2023

(86) PCT No.: PCT/CN2023/103199
§ 371 (c)(1),
(2) Date: Dec. 16, 2024

(87) PCT Pub. No.: WO2024/002162
PCT Pub. Date: Jan. 4, 2024

(65) Prior Publication Data

US 2025/0380023 A1 Dec. 11, 2025

(30) Foreign Application Priority Data

Jun. 28, 2022 (CN) ......................... 202210784430.1

(51) Int. Cl.
*H04N 21/431* (2011.01)
*H04N 21/2187* (2011.01)
(Continued)

(52) U.S. Cl.
CPC ..... *H04N 21/4312* (2013.01); *H04N 21/2187* (2013.01); *H04N 21/4788* (2013.01); *H04N 21/8146* (2013.01)

(58) Field of Classification Search
None
See application file for complete search history.

(56) References Cited

U.S. PATENT DOCUMENTS 11,785,307 B1 * 10/2023 Roberts ................. H04L 65/612 725/37
12,389,063 B2 * 8/2025 Li ...................... H04N 21/4312
(Continued)

FOREIGN PATENT DOCUMENTS

CA 3114099 A1 * 4/2020 ......... G06Q 30/0641
CN 105208453 A * 12/2015 ......... H04N 21/4788
(Continued)

OTHER PUBLICATIONS

CN-11-225408 translation (Year: 2019).*
(Continued)

*Primary Examiner* — Ricky Chin
(74) *Attorney, Agent, or Firm* — Alleman Hall LLP

(57) ABSTRACT

The embodiments of the present disclosure relate to a method and apparatus for interaction in a live-streaming room, and a device and a medium. The method comprises: receiving a preset interaction operation, which is performed in the current live-streaming room; in response to the preset interaction operation meeting a preset condition, triggering to generate an interaction image on the basis of target object information of the current live-streaming room; and displaying the interaction image in a live-streaming room interface of the current live-streaming room.

17 Claims, 10 Drawing Sheets

(51) Int. Cl.
*H04N 21/4788* (2011.01)
*H04N 21/81* (2011.01)

(56) References Cited

U.S. PATENT DOCUMENTS

| | | | | |
|---|---|---|---|---|
| 2012/0131483 | A1* | 5/2012 | Archer | G06F 3/0486 715/766 |
| 2016/0196584 | A1* | 7/2016 | Franklin | G06Q 30/0267 715/745 |
| 2018/0032317 | A1* | 2/2018 | Healy | G06T 11/60 |
| 2019/0030437 | A1* | 1/2019 | Subbiah | A63F 13/35 |
| 2020/0202603 | A1* | 6/2020 | Choi | G06T 11/80 |
| 2021/0089117 | A1* | 3/2021 | Bodolec | G06F 3/013 |
| 2021/0185386 | A1* | 6/2021 | Kong | H04N 21/4394 |
| 2021/0235132 | A1* | 7/2021 | Varan | A61B 5/38 |
| 2021/0409787 | A1 | 12/2021 | Bloom et al. | |
| 2022/0233956 | A1* | 7/2022 | Fukushige | A63F 13/213 |
| 2022/0414962 | A1* | 12/2022 | Shirai | G06F 3/011 |
| 2023/0065048 | A1* | 3/2023 | Takakuwa | G06T 13/40 |
| 2023/0090342 | A1* | 3/2023 | Barlier | G06T 13/40 |
| 2023/0215067 | A1* | 7/2023 | Silverstein | G06T 13/205 |
| 2024/0013502 | A1* | 1/2024 | Baba | G06T 19/20 |
| 2024/0114196 | A1* | 4/2024 | Zhang | G06F 3/0488 |
| 2024/0129585 | A1* | 4/2024 | Zhang | H04N 21/472 |
| 2024/0364940 | A1* | 10/2024 | Zhang | G06Q 30/06 |
| 2025/0022489 | A1* | 1/2025 | Fujihara | H04N 5/92 |
| 2025/0184555 | A1* | 6/2025 | Li | H04N 21/2187 |
| 2025/0287064 | A1* | 9/2025 | Zhu | H04N 21/23418 |
| 2025/0301025 | A1* | 9/2025 | Cai | H04L 65/1069 |
| 2025/0310593 | A1* | 10/2025 | Feng | H04N 21/4758 |
| 2025/0310609 | A1* | 10/2025 | Li | H04N 21/47205 |
| 2025/0323885 | A1* | 10/2025 | Wang | G06F 9/451 |
| 2025/0373890 | A1* | 12/2025 | Vella | H04N 21/44008 |

FOREIGN PATENT DOCUMENTS

| | | | | | |
|---|---|---|---|---|---|
| CN | 105608715 | A | | 5/2016 | |
| CN | 106998492 | A | * | 8/2017 | H04N 21/4756 |
| CN | 108401175 | A | * | 8/2018 | G06F 40/289 |
| CN | 110225408 | A | * | 9/2019 | H04N 21/4788 |
| CN | 110719533 | A | | 1/2020 | |
| CN | 110913264 | A | | 3/2020 | |
| CN | 111669660 | A | * | 9/2020 | G06F 3/04817 |
| CN | 108769724 | B | | 12/2020 | |
| CN | 112616063 | A | | 4/2021 | |
| CN | 112995695 | A | | 6/2021 | |
| CN | 113157157 | A | | 7/2021 | |
| CN | 113382274 | A | | 9/2021 | |
| CN | 113825010 | A | | 12/2021 | |
| CN | 114007143 | A | * | 2/2022 | H04N 21/4363 |
| CN | 114286156 | A | | 4/2022 | |
| CN | 114390308 | A | | 4/2022 | |
| CN | 114466209 | A | | 5/2022 | |
| CN | 114666671 | A | | 6/2022 | |
| CN | 115225948 | A | | 10/2022 | |
| JP | 2013540327 | A | * | 10/2013 | G06N 3/08 |
| JP | 5756198 | B2 | * | 7/2015 | A63F 13/00 |
| JP | 2017126340 | A | * | 7/2017 | |
| KR | 101662172 | B1 | * | 10/2016 | G06F 3/017 |
| KR | 20200041839 | A | * | 4/2020 | H04N 21/816 |
| WO | WO-2012061804 | A1 | * | 5/2012 | G16H 50/70 |
| WO | WO-2013113521 | A1 | * | 8/2013 | G08B 13/19686 |
| WO | 2018045553 | A1 | | 3/2018 | |
| WO | WO-2018177134 | A1 | * | 10/2018 | G06F 3/0484 |
| WO | 2021068652 | A1 | | 4/2021 | |
| WO | WO-2021212089 | A1 | * | 10/2021 | H04N 21/632 |
| WO | WO-2022066438 | A1 | * | 3/2022 | A63F 13/35 |
| WO | WO-2022111164 | A1 | * | 6/2022 | G06T 13/40 |
| WO | WO-2022113329 | A1 | * | 6/2022 | A63F 13/86 |
| WO | WO-2022262560 | A1 | * | 12/2022 | H04N 21/431 |

OTHER PUBLICATIONS

English translation WO2018177134 (Year: 2018).*

Xiao, Y., "Cleverly set up live interaction to improve the efficiency of biology online courses," Biology Teaching, vol. 45, No. 11, Dec. 25, 2020, 4 pages. Submitted with English abstract.

Li, S., "Study on the role subject of webcast reward," The Economist, Issue 4, Apr. 5, 2021, 3 pages. Submitted with English abstract.

Saxena, N. et al., "Non-Interactive Self-Certification for Long-Lived Mobile Ad Hoc Networks," IEEE Transactions on Information Forensics and Security, vol. 4, Issue 4, Dec. 2009, 10 pages.

China National Intellectual Property Administration, Office Action and Search Report Issued in Application No. 202210784430.1, Jul. 6, 2023, 16 pages.

China National Intellectual Property Administration, Office Action and Search Report Issued in Application No. 202210784430.1, Dec. 19, 2023, 14 pages.

ISA China National Intellectual Property Administration, International Search Report and Written Opinion Issued in Application No. PCT/CN2023/103199, Oct. 19, 2023, WIPO, 18 pages.

China National Intellectual Property Administration, Notice of Grant of Invention Patent Right Issued in Application No. 202210784430.1, Dec. 8, 2024, 8 pages.

European Patent Office, Extended European Search Report Issued in Application No. 23830335.8, May 15, 2026, 21 pages.

Deep Gaming, "Stream Avatars Full Walkthrough & Tutorial for Twitch, Youtube & Facebook Gaming 2021," Youtube, Available Online at https://www.youtube.com/watch?v=fTRFFLxobKE, Mar. 29, 2021, 2 pages.

* cited by examiner

METHOD AND APPARATUS FOR INTERACTION IN LIVE-STREAMING ROOM, AND DEVICE AND MEDIUM

CROSS-REFERENCE TO RELATED APPLICATIONS

The present disclosure is a U.S. National Stage application under 35 U.S.C. § 371 of International Application No. PCT/CN2023/103199 filed on Jun. 28, 2023, which is based on and claims priority to the Chinese Patent Application No. 202210784430.1 filed on Jun. 28, 2022, and entitled “METHOD AND APPARATUS FOR INTERACTION IN LIVE-STREAMING ROOM, AND DEVICE AND MEDIUM”, and the disclosure of both applications are incorporated by reference herein in their entireties.

TECHNICAL FIELD

The present disclosure relates to the technical field of image processing, and particularly to a live room interaction method and apparatus, a device and a medium.

BACKGROUND

With the rise of short video applications, a live based on a live room is very common, and therefore more and more attention is paid to improving interaction between the live room and viewers.

In the related art, controls such as like, comment and share are provided on a live room interface, to meet users' interaction requirements based on triggering by the users on the controls.

However, the existing live room interaction mode is single, cannot meet users' diversified requirements, and influences the user experience.

SUMMARY

In order to solve the above technical problem or at least partially solve the above technical problem, the present disclosure provides a live room interaction method and apparatus, a device and a medium.

An embodiment of the present disclosure provides a live room interaction method, comprising: receiving a preset interaction operation performed in a current live room; in response to the preset interaction operation meeting a preset condition, triggering to generate an interactive image on the basis of target object information of the current live room; and displaying the interactive image on a live room interface of the current live room.

An embodiment of the present disclosure further provides a live room interaction apparatus, comprising: a receiving module configured to receive a preset interaction operation performed in a current live room; a generation module configured to, in response to the preset interaction operation meeting a preset condition, trigger to generate an interactive image on the basis of target object information of the current live room; and a display control module configured to display the interactive image on a live room interface of the current live room.

An embodiment of the present disclosure further provides an electronic device, comprising: a processor; a memory configured to store instructions executable by the processor; the processor being configured to read the executable instructions from the memory and execute the instructions to implement the live room interaction method according to the embodiment of the present disclosure.

An embodiment of the present disclosure further provides a computer-readable storage medium having stored thereon a computer program, for performing the live room interaction method according to the embodiment of the present disclosure.

An embodiment of the present disclosure further provides a computer program product, wherein, when instructions in the computer program product are executed by a processor, implements the live room interaction method according to the embodiment of the present disclosure.

An embodiment of the present disclosure further provides a computer program comprising: instructions which when executed by a processor, implement the live room interaction method according to the embodiment of the present disclosure.

BRIEF DESCRIPTION OF THE DRAWINGS

The above and other features, advantages, and aspects of the embodiments of the present disclosure will become more apparent in conjunction with the accompanying drawings and with reference to the following DETAILED DESCRIPTION. Throughout the drawings, identical or similar reference numbers refer to identical or similar elements. It should be understood that the drawings are schematic and that components and elements are not necessarily drawn to scale.

DETAILED DESCRIPTION

Figure 1:
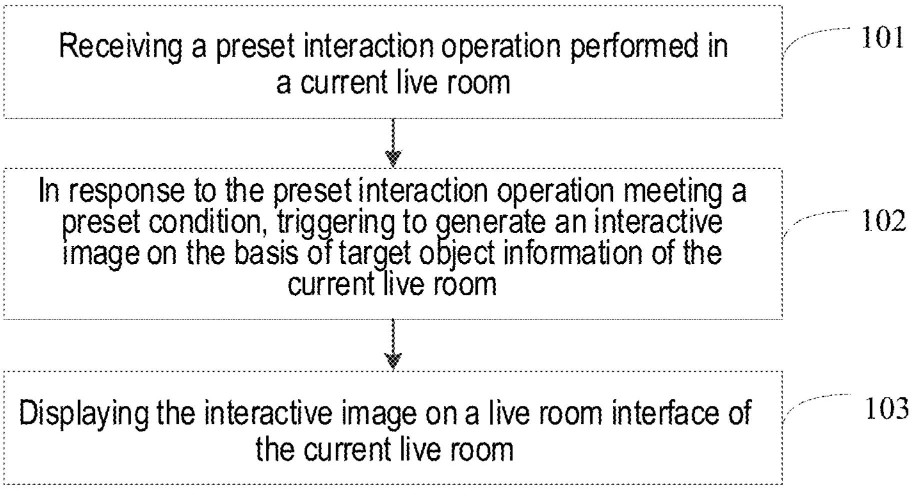
FIG. 1 is a schematic flowchart of a live room interaction method according to an embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, but rather, these embodiments are provided for a more complete and thorough understanding of the present disclosure. It should be understood that the drawings and the embodiments of the present disclosure are for exemplary purposes only and are not intended to limit the protection scope of the present disclosure.

It should be understood that various steps recited in method embodiments of the present disclosure may be performed in a different order, and/or performed in parallel. Moreover, the method embodiments may comprise additional steps and/or omit performing the illustrated steps. The scope of the present disclosure is not limited in this respect.

The term "comprising" and variations thereof used herein is intended to be open-ended, i.e., "comprising but not limited to". The term "based on" is "at least partially based on". The term "one embodiment" means "at least one embodiment"; the term "another embodiment" means "at least one other embodiment"; the term "some embodiments" means "at least some embodiments". Relevant definitions for other terms will be given in the following description.

It should be noted that the concepts of "first", "second", and the like mentioned in the present disclosure are only used for distinguishing different devices, modules or units, and are not used for limiting the order or interdependence of functions performed by the devices, modules or units.

It should be noted that modifications of "one", "plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

In order to solve the above problem, an embodiment of the present disclosure provides a live room interaction method, which is described below in conjunction with specific embodiments.

Compared with the related art, the technical solution according to the embodiment of the present disclosure has the following advantages.

The live room interaction solution according to the embodiment of the present disclosure comprises: receiving a preset interaction operation performed in a current live room, in response to the preset interaction operation meeting a preset condition, triggering to generate an interactive image on the basis of target object information of the current live room, and displaying the interactive image on a live room interface of the current live room. Therefore, users' diversified requirements are met, interactive atmosphere of the live room is improved, and interactive experience is improved.

FIG. 1 is a schematic flowchart of a live room interaction method according to an embodiment of the present disclosure, where the method may be performed by an interactive image generation apparatus, and the apparatus may be implemented by software and/or hardware, and may generally be integrated in an electronic device where a client corresponding to the live room is located, of course, the live room interaction method of the embodiment may also be integrated in a server for the live broadcast room, without limitation, whether it is on the client side or on the server side, the corresponding functional steps are similar. As shown in FIG. 1, the method comprises:

step 101, receiving a preset interaction operation performed in a current live room.

Wherein, the preset interaction operation comprises: at least one of a like operation, a comment operation or a share operation.

In some embodiments of the present disclosure, a preset interaction operation performed in a current live room is received, so as to perform interaction feedback based on the preset interaction operation.

In some possible embodiments, it can be understood that, when generating an interactive image, in order to prompt interactive participation, in the process of detecting an interactive activity, interactive prompt information is displayed on a live interface of a current live room, to visually prompt an interactive progress of an interactive stage, etc. The interactive prompt information is used for prompting the interactive progress of the interactive stage corresponding to the preset interaction operation, such as when the interaction starts, when the interaction ends, the duration of the interactive stage, and the like. The interactive prompt information can also comprise at least one of interactive copywriting information or interactive icon information, so as to visually prompt that the current live room is in an interactive stage.

Figure 2A:
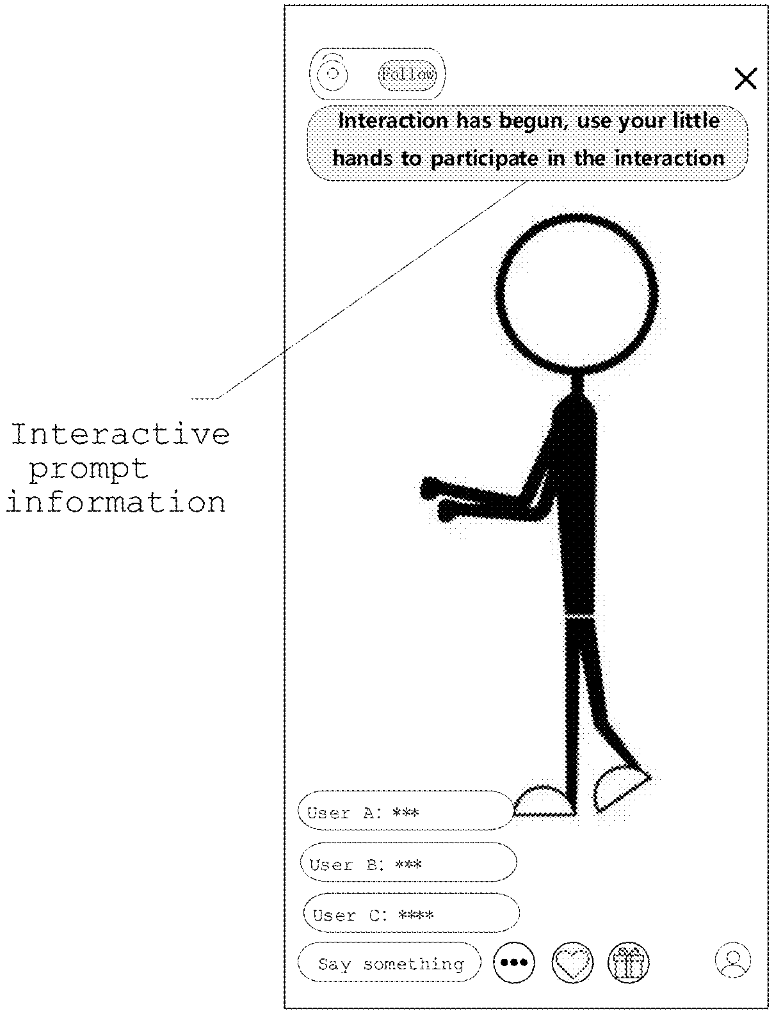
FIG. 2A is a schematic diagram of an interactive prompt information according to an embodiment of the present disclosure.
Figure 2B:
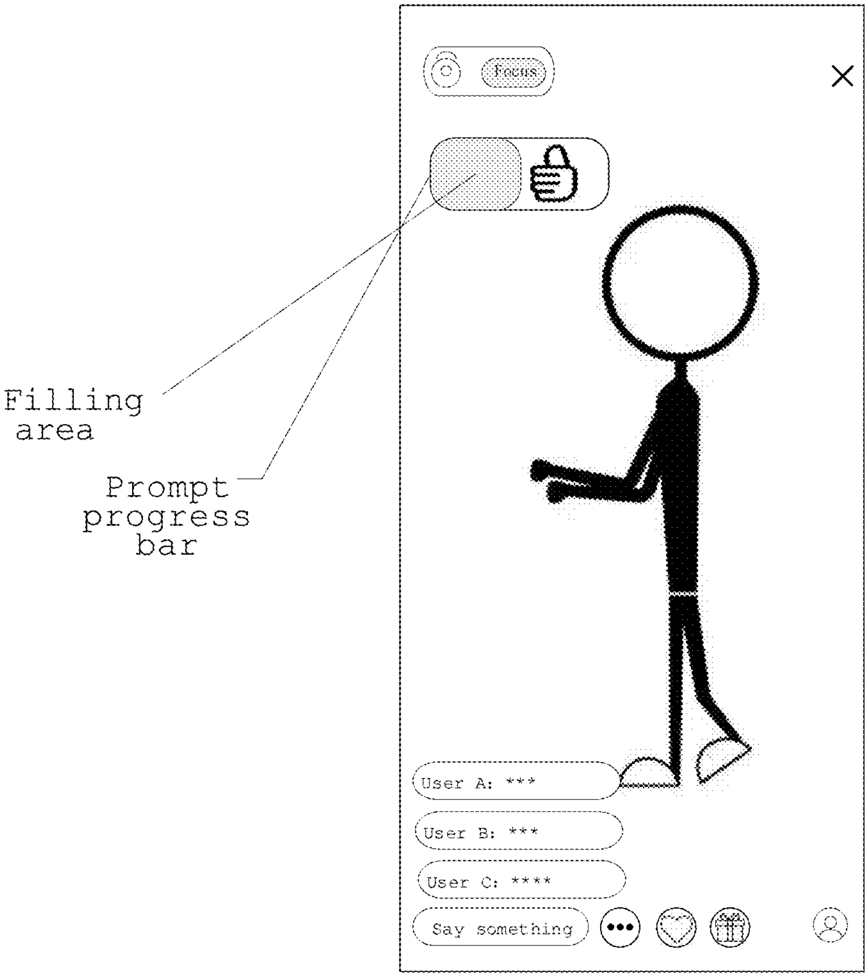
FIG. 2B is a schematic diagram of another interactive prompt information according to an embodiment of the present disclosure.

In some possible embodiments, as shown in FIG. 2A, the interactive prompt information may be in a text form, such as text displaying "interaction has begun, use your little hands to participate in the interaction"; in some other possible embodiments, the interactive prompt information may be an interactive prompt progress bar, and a filling progress of the interactive prompt progress bar increases with the increase of a duration of the interactive stage; the interactive prompt bar may be in a form of a progress bar or a "tray", as shown in FIG. 2B, and if it is in the form of a "tray", an area may be gradually filled according to the duration of the interactive stage, to visually present how much time is left in the current interactive stage and the like, and the progress of the interactive stage is identified by a "gradually filled" visual effect.

In an actual implementation, if the position where the interactive prompt information is displayed contains other elements, for example, other component elements in the form of a "tray", then the other elements can be controlled to be removed after being displayed for a second preset duration, and then the interactive prompt information is displayed, or the other elements can be controlled to move to a blank area of the current live interface, or the like.

Of course, the interactive prompt information may be in any other visual form such as animation, which is not listed here.

In some possible embodiments, a live client may receive a preset interaction operation performed by a user in the current live room, in the current live room, for example, the live client of the current user may receive the preset interaction operation performed by the current user in the current live room.

Step 102, in response to the preset interaction operation meeting a preset condition, triggering to generate an interactive image on the basis of target object information of the current live room.

In some possible embodiments, the preset interaction operation may include at least one of like operation, comment operation, or share operation, and the preset interaction operation meeting the preset condition includes that interaction data corresponding to the preset interaction operation meets the preset condition. For example, the number of operations (for example, the number of likes) corresponding to the interaction operation in a preset duration is greater than or equal to a preset number threshold, wherein, the number of operations corresponding to the interaction operation may be the number of interaction operations that all users in the current live room perform in the preset duration (or a preset time period), or may also be the number of interaction operations that some users (for example, the current user) in the current live room perform in the preset duration, which is of course not limited to this.

In some embodiments of the present disclosure, in response to the preset interaction operation meeting a preset condition, it is considered at this time that the timing of improving interactive atmosphere is reached, and therefore, it is triggered to generate an interactive image on the basis of target object information of the current live room. A subject for generating the interactive image can be a client or a server. The interactive image can be generated by the client or the server, and if the server generates the interactive image, the client acquires the interactive image from the server, thereby reducing the delay.

In some possible embodiments, in order to improve the interactive experience, information of an interactive object performing the preset interaction operation is acquired as target object information, and it is triggered to generate an interactive image on the basis of the target object information of the current live room. The interactive object is, for example, an object participating in the interaction in the live room, i.e., an interaction participant, such as a user who does like operation in the live room; the target object information includes, but is not limited to, object nickname and object avatar, etc.

In some possible embodiments, information of all viewing objects viewing the current live room is determined as the target object information, wherein the viewing object is, for example, a viewer in the live room; the information of the viewing object comprises but is not limited to object nickname, object avatar and the like, therefore the interactive activity of the current live room is improved.

Step 103, displaying the interactive image on a live room interface of the current live room.

The interactive image can be an image in any form, for example, an image generated by splicing according to the target object information, an image displayed based on the interaction operation, and the like; when the preset interaction operation meets the preset condition, the interactive image is displayed on the live room interface, forming an effect of an Easter egg, expanding the interactive mode of the live room, meeting the users' diversified requirements, and improving the interactive experience of the users.

In some embodiments of the present disclosure, the interactive image is displayed on the live room interface of the current live room, that is, in this embodiment, the interactive image is displayed on the live room interface of the current live room in order to enhance the interactive experience.

In order to further improve the interactive experience, a save operation, a share operation and the like can be performed on the interactive image.

Figure 3:
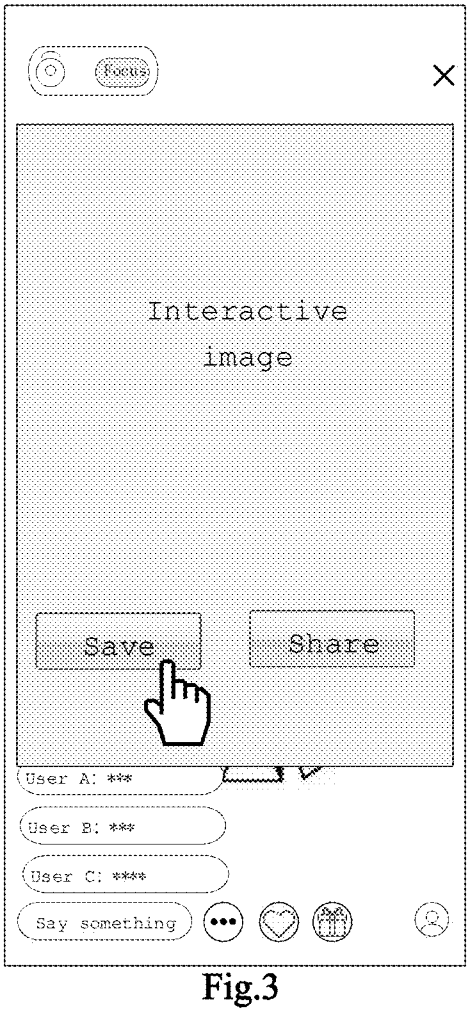
FIG. 3 is a schematic diagram of an interactive image display scene according to an embodiment of the present disclosure.

In some embodiments of the present disclosure, in response to a save operation performed on the interactive image by a corresponding interactive object, storage processing is performed for the interactive image, for example, a corresponding live viewing client is controlled to store the interactive image locally, wherein the save operation may be implemented by triggering a corresponding displayed save control, as shown in FIG. 3.

In some embodiments of the present disclosure, in response to a share operation of a corresponding interactive object on the interactive image, a corresponding live viewing client may be controlled to display a share page corresponding to the interactive image, that is, to jump to the share page, where the share page may be a corresponding active page or a share page corresponding to a sharing channel; continuously as shown in FIG. 3, the share operation may be implemented by triggering a corresponding displayed share control, or may be implemented by inputting a corresponding voice or performing a gesture operation matched with the share operation, or the like.

Therefore, in the interactive image generation method according to the embodiment of the present disclosure, the interactive image is displayed in the live room according to the interaction operation, improving the interactive experience, improving the atmosphere in the interactive stage, and significantly improving the activity of the live room.

In summary, in the interactive image generation method according to the embodiment of the present disclosure, in response to the preset interaction operation meeting the preset condition, it is triggered to generate the interactive image on the basis of the target object information of the current live room, and the interactive image is displayed on the live room interface of the current live room. Therefore, the interactive image is generated based on the interaction operation of the user, enhancing the interactive experience, enhancing the interactive atmosphere in the live room, expanding the interactive mode of the live room, meeting the users' diversified requirements, improving the interactive atmosphere of the live room, and improving the interactive experience.

It should be noted that, based on the above embodiments, in different application scenes, the preset interaction operation meeting the preset condition differently, there are examples as follows:

In some embodiments of the present disclosure, in response to the number of operations corresponding to the interaction operation within a first preset duration being greater than or equal to a preset number threshold, specifically, when the number of operations within the preset duration from the start of the interaction to the end of the interaction is greater than or equal to the preset number threshold, it is determined that the preset condition is met, so that in some scenes, the interactive image is generated following the interaction activity degree of the current live video, improving the flexibility of the interaction in the live room.

In some embodiments of the present disclosure, the interactive stage is started according to a time period, for example, in some live rooms, an anchor A may participate in a live in a certain time period, or a live for a certain promotion object is started in a certain time period, so that, in order to improve the live atmosphere within the time period, the time period is determined as the interactive stage.

In this embodiment, a preset interaction start time and a preset interaction end time are determined according to scene requirements, the preset interaction start time and the preset interaction end time are determined according to the preset time period, in response to the current time being the preset interaction start time, an interaction start instruction is detected, and after the interaction start instruction is detected, the preset interaction operation mentioned in the step 101 starts to be received.

In some embodiments of the present disclosure, in order to meet personalized requirements of the interactive stage, customized settings for the interactive stage can be used.

In this embodiment, a preset start control and a preset end control are displayed on the live interface of an anchor client corresponding to the current live room, so that in response to a trigger operation on the preset start control, the interaction start instruction is detected, and in response to the trigger operation on the preset start control on the live interface, the preset interaction operation mentioned in the step 101 starts to be received.

In this embodiment, in response to detecting an interaction end instruction, it is determined that the preset interaction operation meets the preset condition, that is, when the interaction end instruction is detected, the interactive stage is considered to be ended, and the like, so that in order to form an interaction for the target object in the interactive stage, the preset interaction operation is considered to meet the preset condition, and thus, an interactive image is further generated. In some embodiments of the present disclosure, in order to improve the sense of participation of the user, after the interactive stage is finished, the live viewing interface is controlled to display the interactive image, thereby enhancing the sense of benefit from participating in the interaction.

In summary, the live room interaction method in the embodiment of the present disclosure can flexibly determine the meeting of the preset condition according to scene requirements, thereby facilitating the generation of the interactive image, further expanding the interaction mode of the live room, and meeting the users' diversified requirements.

The generation of interactive image information is described below in conjunction with a specific embodiment.

In some embodiments of the present disclosure, the target object information may include an object avatar and an object name, and in this embodiment, a cover image of a live room in this interactive stage or a preset template image may be obtained, and the object avatar and the object name may be rendered on the cover image of the live room or the preset template image to obtain an interactive image. The preset interaction template image may be default in advance, or may be actively selected by the current target object, for example, the live room interface is a live interface corresponding to the current target object, and in obtaining the preset interactive image template, in response to a trigger operation of the current target object on a plurality of preset candidate interactive image templates, the interactive image template corresponding to the trigger operation is obtained, thereby further meeting the personalized requirement of the target object.

Figure 4:
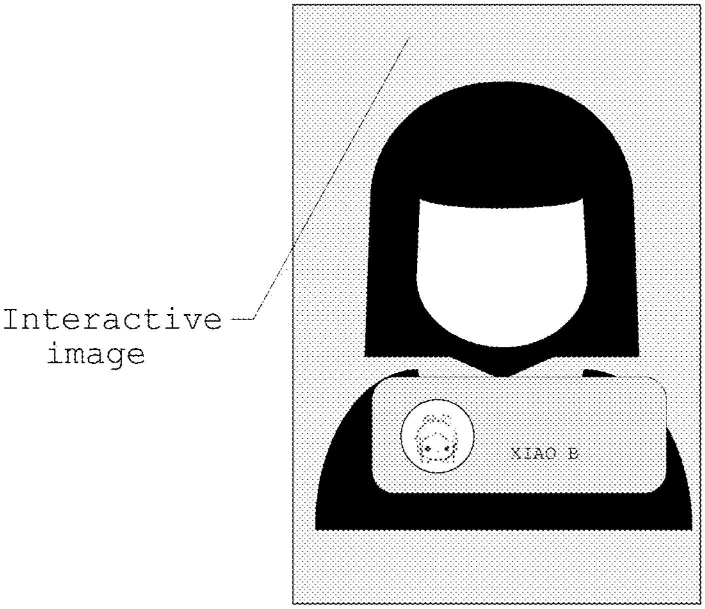
FIG. 4 is a schematic diagram of another interactive image display scene according to an embodiment of the present disclosure.

In this embodiment, for example, if the current live room is the live room of the anchor A, the preset template image is an upcoming concert poster of the anchor A; for an interactive user B, as shown in FIG. 4, the displayed interactive image embodies that the concert poster is taken as a background image, the object name (in the figure, “XIAO B”) and the object avatar are taken as upper-layer display content, and the target object can know from the interactive image that he participates in a live of the live room of the anchor A. The display position and display form of the object avatar and the object name in FIG. 4 are merely an example, and in an actual implementation, the display position and display form of the object avatar and the object name may be set according to a scene, which is not limited herein.

That is, in some embodiments of the present disclosure, in order to ensure correlation between the generated interactive image and the current live video, the interactive image template may be an interactive image template corresponding to anchor information of the live room, wherein the anchor information includes, but is not limited to, an anchor name, an anchor avatar, and the like. The interactive image generated in the embodiment of the present disclosure may include both the target object image and the anchor image, and specifically, the anchor image contour may be obtained through the target object image, thereby enriching the interaction modes, for example, combining the target object image into the anchor image contour shape and the like.

In this embodiment, the interactive image template corresponds to the anchor information, for example, the anchor information is A, and may be the concert poster of A and the like, thereby ensuring the correlation between the interactive image template and the anchor information of the current live room, so that the generated interactive image corresponds to the anchor information, and by visually presenting the correlation between the interactive image and the anchor information through the interactive image, the sense of interactive participation is improved, for example, if the anchor user corresponding to the current live room is the anchor A, the corresponding first object may be the poster of anchor A, and the like.

In some embodiments of the present disclosure, the target object information may include an object avatar, and in this embodiment, the interactive image template is preset, where the interactive image template includes a plurality of avatar display areas which may be arranged two-dimensionally, or according to a preset shape, for example, a circle or a triangle, and sizes and shapes of the plurality of avatar display areas may be the same or different.

Figure 5A:
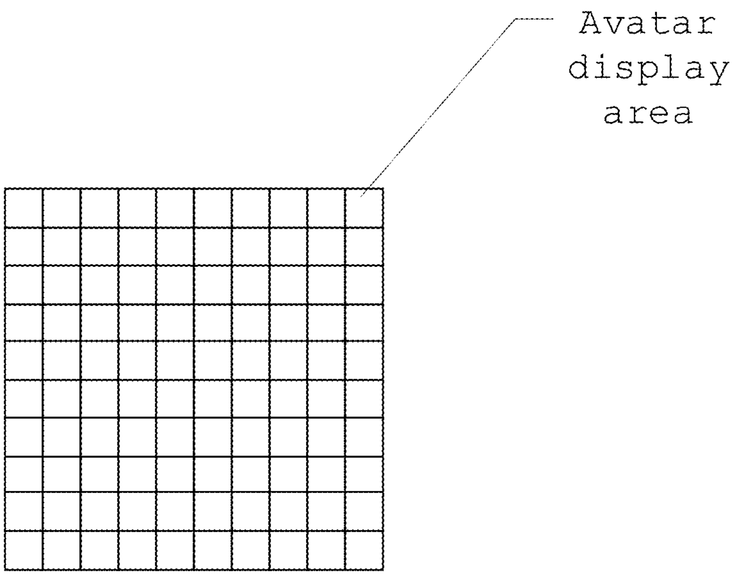
FIG. 5A is a schematic diagram of another interactive image display scene according to an embodiment of the present disclosure.
Figure 5B:
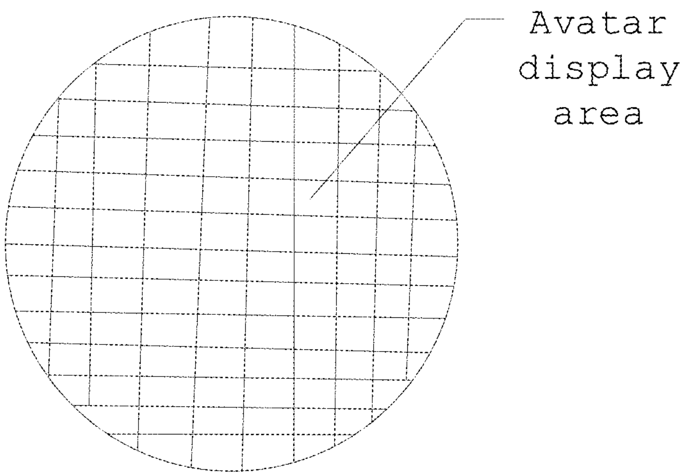
FIG. 5B is a schematic diagram of another interactive image display scene according to an embodiment of the present disclosure.

For example, as shown in FIG. 5A, the interactive image template includes 100 avatar display areas which are uniformly distributed two-dimensionally in horizontal and vertical directions, and the sizes of the avatar display areas are the same; and for example, as shown in FIG. 5B, the interactive image template includes a plurality of avatar display areas which are arranged in a circle, and sizes and shapes of the plurality of avatar display areas are not all the same, etc.

In an embodiment of the present disclosure, the object avatars are displayed in the plurality of avatar display areas to generate the interactive image.

In some possible embodiments, taking into account that the number of the plurality of avatar display areas may be inconsistent with the number of interactive users actually participating in the interaction, a first number of all object avatars and a second number of the plurality of avatar display areas are determined.

If the first number is less than or equal to the second number, a plurality of object avatars are displayed in the plurality of avatar display areas, where the avatar display areas for displaying the plurality of object avatars may be randomly determined, or may be selected according to a preset sequence, for example, if the second number is 100 and the first number is 90, it may be determined according to the numbers of the plurality of avatar display areas that the first 90 avatar display areas are used to display the object avatars, wherein one object avatar is displayed in each avatar display area, and the object avatars displayed in different avatar display areas are different.

In the embodiment, an idle avatar display area in which the object avatar is not displayed is determined, and a preset template avatar is displayed in the idle avatar display area to generate the interactive image. The preset template avatar may be a preset avatar picture, and the preset template avatar displayed in different idle avatar display areas may be the same or different, which is not described herein again. Therefore, since the interactive image contains the target object information, the sense of interactive participation is improved, and by displaying the preset avatar picture in the idle avatar display area, a reality sense of the interactive image is improved.

The object avatar of the current interactive object may be also subjected to deformation, and the deformed object avatar may be displayed in the idle avatar display area, or the like.

In some embodiments of the present disclosure, if the first number of the object avatars of the interactive objects is greater than the second number of the avatar display areas, the second number of the target object avatars are determined in all the object avatars, the second number of the target object avatars may be selected in order of interaction time from earliest to latest, or may be selected randomly, and are displayed in the plurality of avatar display areas to generate the interactive image. One target object avatar is displayed in each avatar display area. Therefore, in the embodiment, the normal generation of the interactive image is ensured, and when the number of the target object avatars is large, the corresponding interactive image can also be generated, improving the flexibility of the generation of the interactive image.

Therefore, in the embodiment, the normal generation of the interactive image is ensured, and when the number of the target object images is large, the corresponding interactive image can also be generated, improving the flexibility of the generation of the interactive image.

Figure 6:
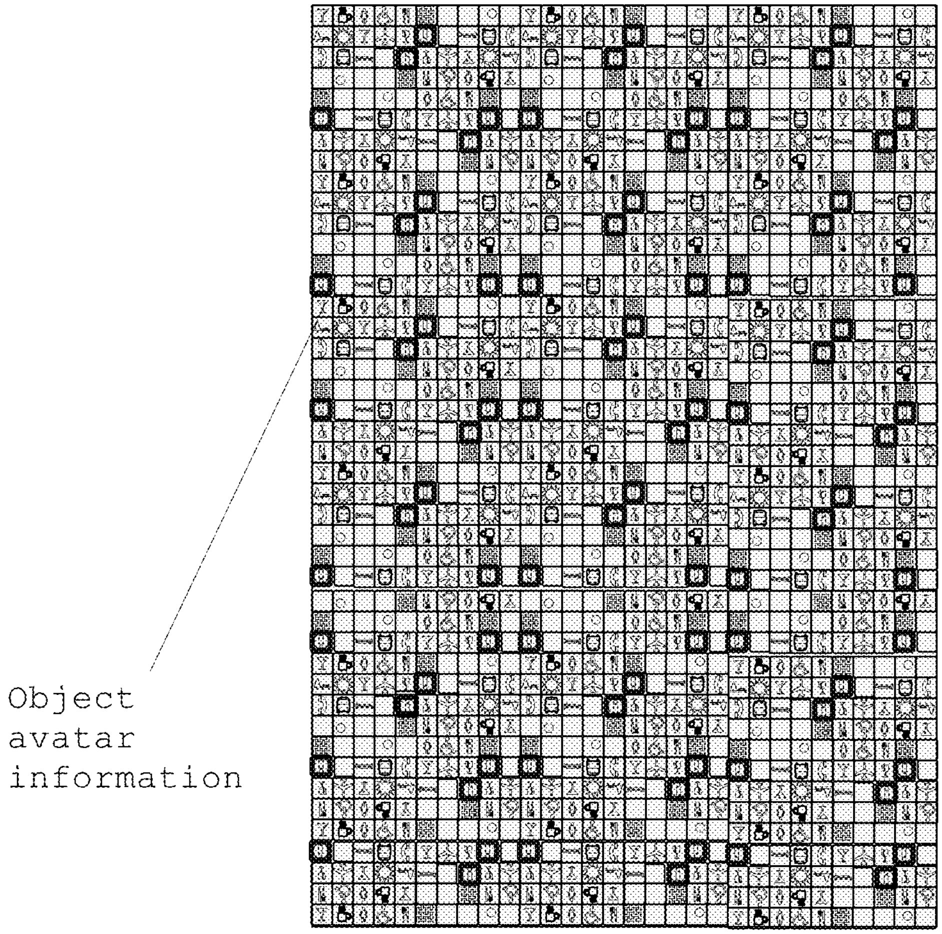
FIG. 6 is a schematic diagram of another interactive image display scene according to an embodiment of the present disclosure.

In this embodiment, as shown in FIG. 6, the generated interactive image includes object avatars of a plurality of interactive objects participating in the interactive stage, and the splicing effect of the generated interactive image can bear the interactive result of the interactive stage, providing a feeling of an Easter egg of real participation.

In some possible embodiments, in order to further enhance the interest of the interactive image, the preset interactive image template further includes a preset background image, where the plurality of avatar display areas are displayed on the preset background image, and the preset background image may be a preset poster corresponding to the interactive stage, for example, a concert poster and the like.

Figure 7A:
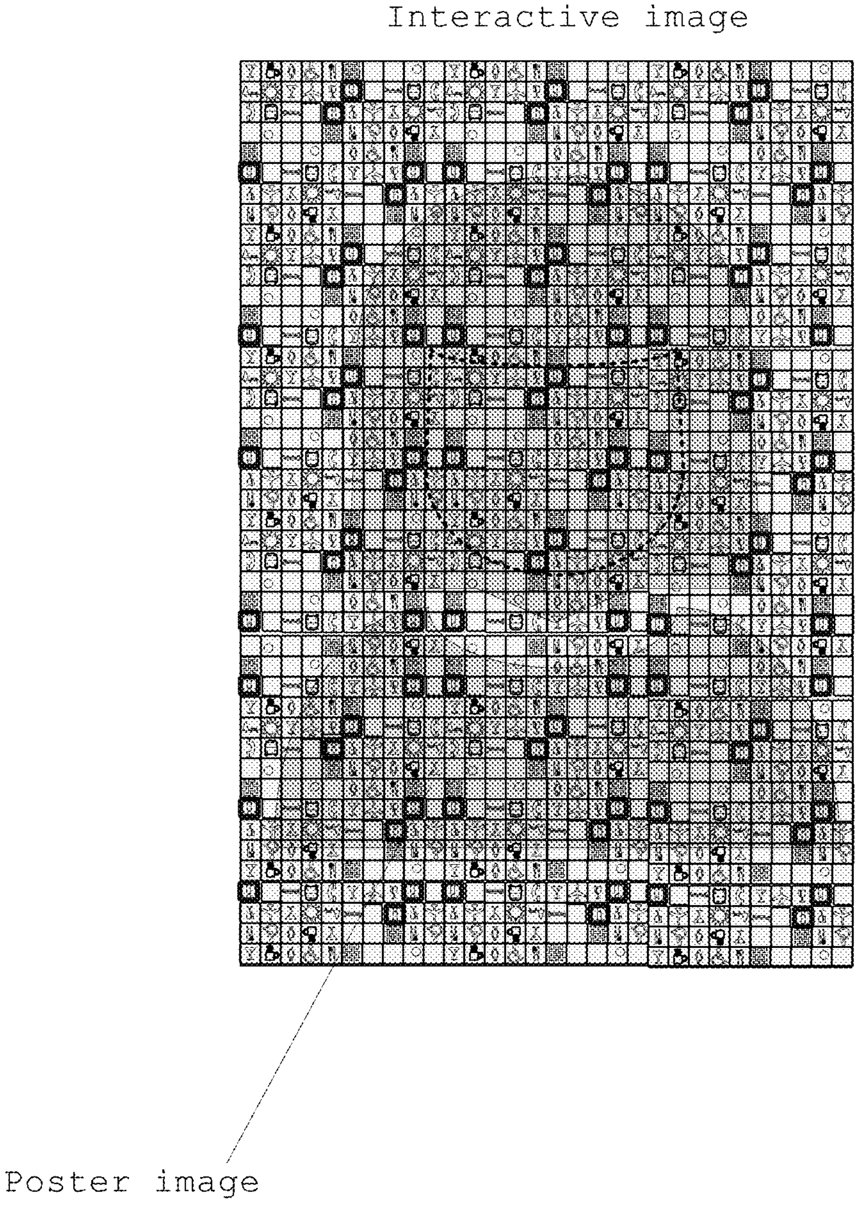
FIG. 7A is a schematic diagram of another interactive image display scene according to an embodiment of the present disclosure.

For example, as shown in FIG. 7A, if the preset background image is a concert poster, a spliced image of object avatars of the plurality of interactive objects can be displayed by using the concert poster corresponding to the anchor as the background.

In some possible embodiments, the preset interactive image template further includes a copywriting display area, which may be at any position of the interactive image template, for example, below the interactive image template, for example, on the left side of the interactive image template, and the copywriting display area includes preset interactive copywriting information, which may contain text information with a meaning, such as "***concert memento", "*year*month*day", and the like.

Figure 7B:
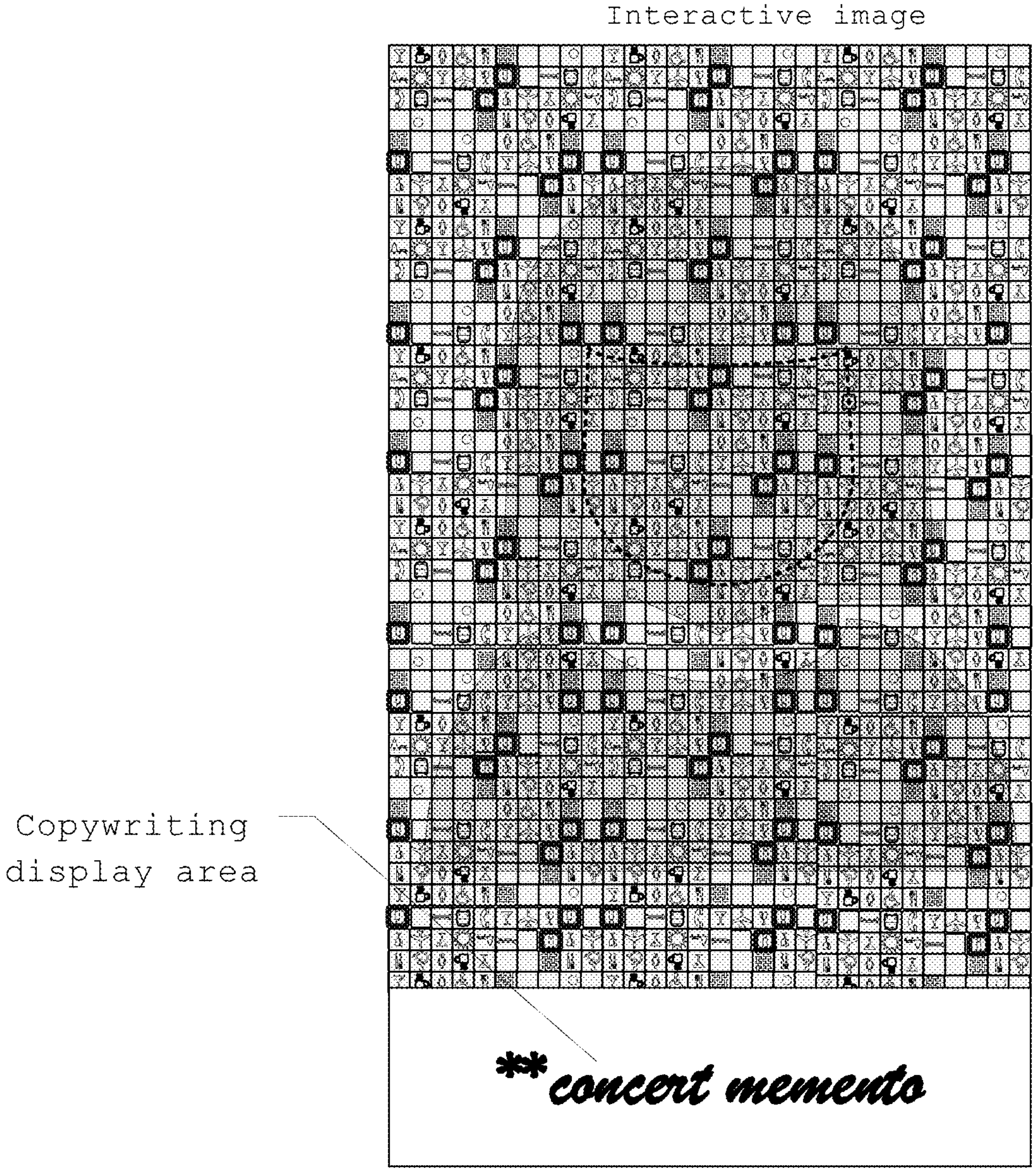
FIG. 7B is a schematic diagram of another interactive image display scene according to an embodiment of the present disclosure.

For example, referring to FIG. 7B, if the preset background image is the concert poster, a spliced image of the plurality of interactive objects may be displayed by using the concert poster as the background, and copywriting information of "***concert memento" is displayed in the copywriting display area below the interactive image template.

In some possible embodiments, in order to further improve the interactive feeling of the user, a first target display position of the target object information of a corresponding interactive object on the interactive image may also be obtained, and in an associated area of the first target display position, position indication information of the target object information is displayed in association, to emphasize the object information of the corresponding interactive object. For example, in the interactive image sent to the interactive object 1, the position indication information of the target object information of the interactive object 1 is displayed in association, and in the interactive image sent to the interactive object 2, the position indication information of the target object information of the interactive object 2 is displayed in association.

Figure 8A:
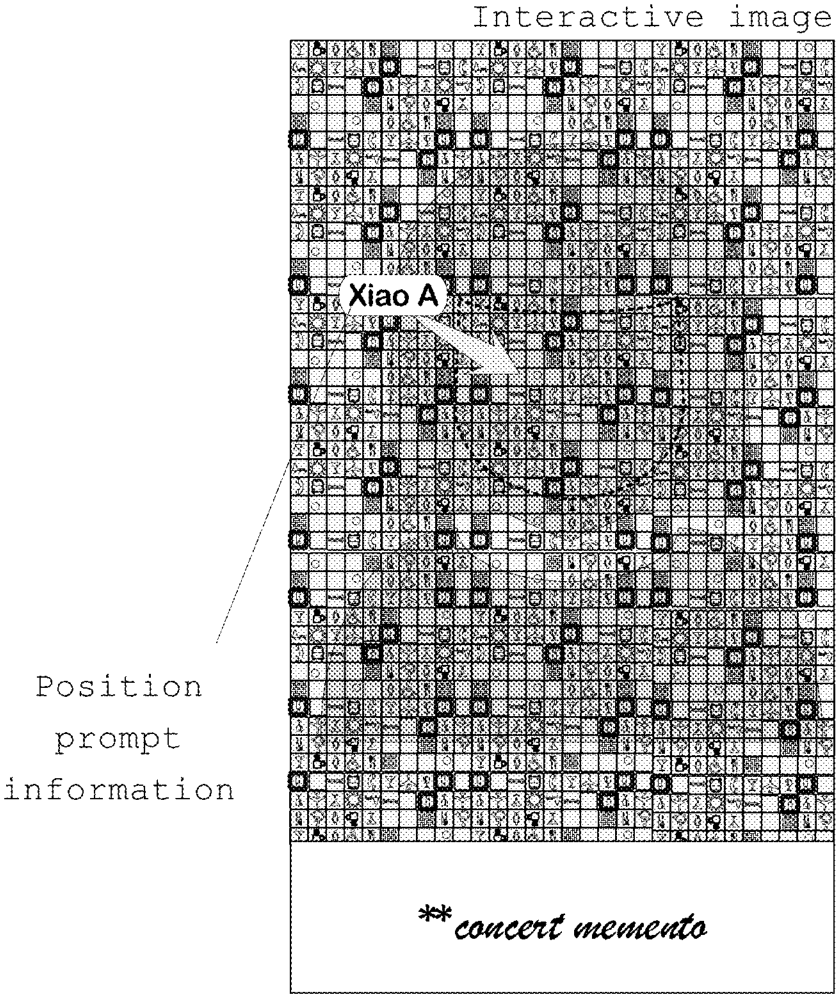
FIG. 8A is a schematic diagram of another interactive image display scene according to an embodiment of the present disclosure.
Figure 8B:
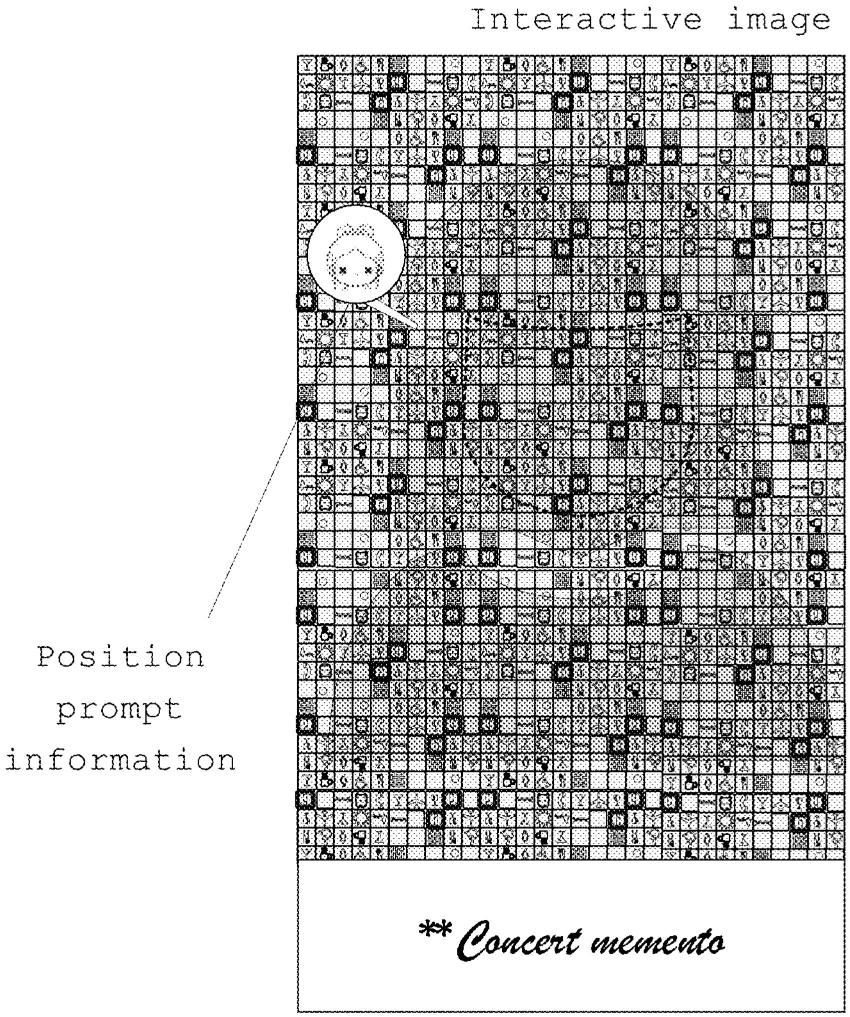
FIG. 8B is a schematic diagram of another interactive image display scene according to an embodiment of the present disclosure.

The position indication information may be any target object information capable of visually highlighting the corresponding target interactive object. For example, as shown in FIG. 8A, the position indication information may be in a form of an arrow, and if the interactive image is sent to the interactive object 1, an arrow pointing to the target object information of the interactive object 1 is displayed in the interactive image, and text information of an object name "XIAO A" of the interactive object 1 is displayed; for example, as shown in FIG. 8B, the position indication information may be in a form of a bubble, and if the interactive image is sent to the interactive object 1, a bubble pointing to the interactive object 1 is displayed in the interactive image, and an area of the bubble is larger than an area of the target object information of the interactive object 1 in the interactive image, for example, an object avatar of the interactive object 1 may be displayed in the bubble, thereby achieving an effect of magnifying the object avatar of the interactive object 1.

In some embodiments of the present disclosure, in order to further meet interactive customized requirements, a second target display position selected by the current target object on the interactive image may be further determined, and such a selection may be made by triggering a corresponding area, or by inputting a corresponding position identifier such as a position coordinate, so that the target object information of the current target object is displayed at the second target display position, and target object information of other target objects may be adaptively adjusted, therefore, the current target object may adjust a display position of the target object information on the interactive image according to personal preference, thereby further meeting the interactive customized requirements.

In conclusion, the live room interaction method according to the embodiment of the present disclosure flexibly generates the interactive image according to the scene requirements, improving the interest of the interaction promotion, and further improving the interactive atmosphere.

In order to realize the above embodiment, the present disclosure further provides a live room interaction apparatus.

Figure 9:
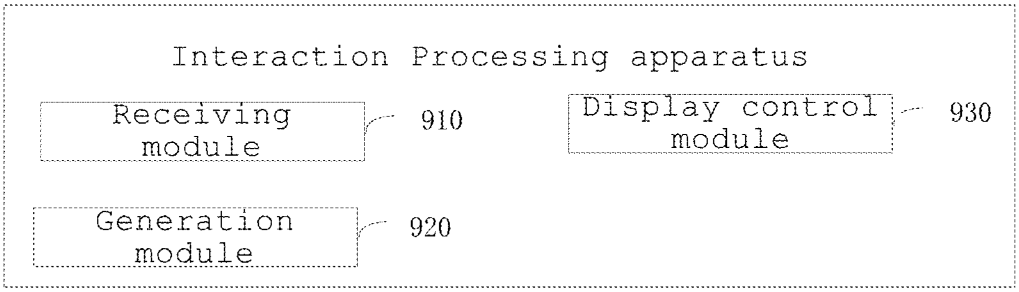
FIG. 9 is a schematic structural diagram of a live room interaction apparatus according to an embodiment of the present disclosure.

FIG. 9 is a schematic structural diagram of a live room interaction apparatus according to an embodiment of the present disclosure, where the apparatus may be implemented by software and/or hardware, and may be generally integrated in an electronic device for interaction processing. As shown in FIG. 9, the apparatus comprises:

a receiving module 910 configured to receive a preset interaction operation performed in a current live room;

a generation module 920 configured to, in response to the preset interaction operation meeting a preset condition, trigger to generate an interactive image on the basis of target object information of the current live room; and a display control module 930 configured to display the interactive image on a live room interface of the current live room.

The modules described above may be implemented as software components executing on one or more general-purpose processors, or may be implemented as hardware for example for performing certain functions, such as programmable logic devices and/or application specific integrated circuits. In some embodiments, the modules may be embodied in the form of a software product, which may be stored in a non-volatile storage medium. The non-volatile storage medium includes instructions to cause a computer device (e.g., a personal computer, server, network device, mobile terminal, etc.) to perform the method described in the embodiment of the present disclosure. In some embodiments, the modules described above may also be implemented on a single device or may be distributed across multiple devices. The functions of these modules may be combined with each other, or further divided into a plurality of sub-modules.

The live room interaction apparatus according to the embodiment of the present disclosure can perform the live room interaction method according to any embodiment of the present disclosure, and has corresponding functional modules and beneficial effects of performing the method.

To implement the above embodiments, the present disclosure further provides a computer program product, comprising a computer program/instructions which when executed by a processor, implement the live room interaction method in the above embodiments.

In some embodiments of the present application, a computer program is further provided, where the computer program comprises instructions which, when executed by a processor, implement the live room interaction method in the above embodiments.

Figure 10:
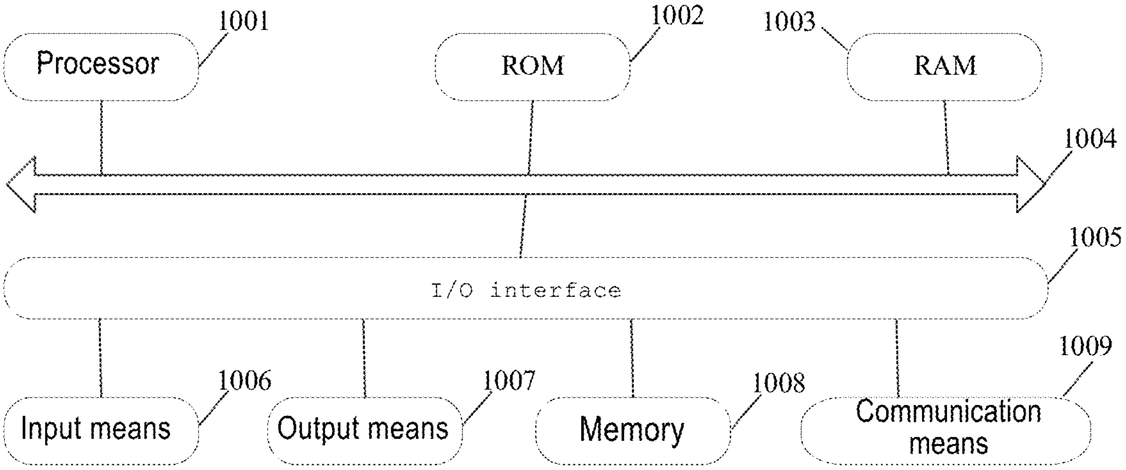
FIG. 10 is a schematic structural diagram of an electronic device according to an embodiment of the present disclosure.

FIG. 10 is a schematic structural diagram of an electronic device according to an embodiment of the present disclosure.

Reference is made below to FIG. 10, which shows a schematic structural diagram of an electronic device 1000 suitable for implementing the embodiments of the present disclosure. The electronic device 1000 in the embodiments of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), and a vehicle-mounted terminal (for example, a vehicle-mounted navigation terminal), and a fixed terminal such as a digital TV and a desktop computer. The electronic device shown in FIG. 10 is only an example and should not bring any limitation to the functions and the scope of use of the embodiments of the present disclosure.

As shown in FIG. 10, the electronic device 1000 may comprise a processor (for example, a central processing unit, a graphics processing unit, etc.) 1001 that may perform various appropriate actions and processes according to a program stored in a read-only memory (ROM) 1002 or a program loaded from a memory 1008 into a random access memory (RAM) 1003. In the RAM 1003, various programs and data necessary for the operation of the electronic device 1000 are also stored. The processor 1001, the ROM 1002, and the RAM 1003 are connected to each other via a bus 1004. An input/output (I/O) interface 1005 is also connected to the bus 1004.

Generally, the following means may be connected to the I/O interface 1005: an input means 1006 including, for example, a touch screen, touch pad, keyboard, mouse, camera, microphone, accelerometer, gyroscope, etc.; an output means 1007 including, for example, a liquid crystal display (LCD), speaker, vibrator, etc.; the memory 1008 including, for example, a magnetic tape, hard disk, etc.; and a communication means 1009. The communication means 1009 may allow the electronic device 1000 to communicate wirelessly or by wire with other devices to exchange data. While the electronic device 1000 having the various means is shown in the FIG. 10, it should be understood that not all illustrated means are required to be implemented or provided. More or fewer means may be alternatively implemented or provided.

In particular, according to the embodiment of the present disclosure, the processes described above with reference to the flow diagrams may be implemented as a computer software program. For example, the embodiments of the present disclosure comprise a computer program product which comprises a computer program carried on a non-transient computer-readable medium, the computer program containing program code for performing the method illustrated by the flow diagrams. In such an embodiment, the computer program may be downloaded from a network via the communications means 1009 and installed, or installed from the memory 1008, or installed from the ROM 1002. The computer program, when executed by the processor 1001, performs the above functions defined in the interactive image generation method of the embodiment of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that can contain or store a program which can be used by or in conjunction with an instruction execution system, apparatus, or device. However, in the present disclosure, the computer-readable signal medium may comprise a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some embodiments, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be embodied in the above electronic device; or may be exist separately without being assembled into the electronic device.

The above computer-readable medium has one or more programs carried thereon, wherein the above one or more programs, when executed by the electronic device, cause the electronic device to: in response to the preset interaction operation meeting the preset condition, trigger to generate the interactive image on the basis of the target object information of the current live room, and display the interactive image on the live room interface of the current live room. Therefore, the interactive image is generated based on the interaction operation of the user, enhancing the interactive experience, enhancing the interactive atmosphere in the live room, expanding the interactive mode of the live room, meeting the users' diversified requirements, improving the interactive atmosphere of the live room, and improving the interactive experience.

The computer program code for performing the operations of the present disclosure may be written in one or more programming languages or a combination thereof by the electronic device, wherein the above programming language includes but is not limited to an object-oriented programming language such as Java, Smalltalk, C++, and includes a conventional procedural programming language, such as the "C" language or similar programming languages. The program code may be executed entirely on a user's computer, partly on a user's computer, as a stand-alone software package, partly on a user's computer and partly on a remote computer, or entirely on a remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which comprises one or more executable instructions for implementing a specified logical function. It should also be noted that, in some alternative implementations, functions noted in blocks may occur in an order different from that noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of blocks in the block diagrams and/or flow diagrams, can be implemented by a special-purpose hardware-based system that performs specified functions or operations, or by a combination of special-purpose hardware and computer instructions.

The unit involved in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing only describes the preferred embodiments of the present disclosure and the technical principles employed. It should be appreciated by those skilled in the art that the disclosed scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A live interaction method, comprising:

receiving a preset interaction operation on a live interface of a live streaming;

in response to the preset interaction operation meeting a preset condition, triggering a generation of an interactive image based on object information associated with the live streaming; and displaying the interactive image on the live interface, wherein the object information comprises object avatar information, the generation of the interactive image based on the object information associated with the live streaming, comprises:

acquiring an interactive image template corresponding to streamer information of the live streaming, wherein the interactive image template comprises a plurality of avatar display areas; and displaying the object avatar information in the plurality of avatar display areas to generate the interactive image, and the displaying the object avatar information in the plurality of avatar display areas to generate the interactive image comprises:

determining a first number of the object avatar information and a second number of the plurality of avatar display areas;

in response to the first number being less than or equal to the second number, displaying the first number of the object avatar information in the plurality of avatar display areas; and determining an idle avatar display area in which the object avatar information is not displayed, and displaying a preset template avatar in the idle avatar display area to generate the interactive image.

2. The method according to claim 1, wherein the preset interaction operation comprises at least one of like operation, comment operation, or share operation.

3. The method according to claim 1, wherein the preset interaction operation meeting the preset condition comprises:

interaction data corresponding to the preset interaction operation meeting the preset condition.

4. The method according to claim 3, wherein the preset interaction operation meeting the preset condition comprises:

the number of operations corresponding to the interaction operation in a preset duration being greater than or equal to a preset number threshold.

5. The method according to claim 1, before the generation of the interactive image based on the object information associated with the live streaming, further comprising:

acquiring information of an interactive object performing the preset interaction operation as the object information; or determining information of all viewing objects viewing the live streaming as the object information.

6. The method according to claim 1, further comprising:

in response to the first number being greater than the second number, determining the second number of object avatar information in the first number of the object avatar information; and displaying the second number of the object avatar information in the plurality of avatar display areas to generate the interactive image.

7. The method according to claim 1, wherein the interactive image template further comprises at least one of:

a preset background image, wherein the plurality of avatar display areas are displayed on the preset background image; or a copywriting display area, wherein the copywriting display area contains preset interactive copywriting information.

8. The method according to claim 1, wherein the live interface is a live interface corresponding to a current object, and the acquiring the interactive image template comprises:

in response to a trigger operation of the current object on a plurality of preset candidate interactive image templates, acquiring an interactive image template corresponding to the trigger operation.

9. The method according to claim 1, further comprising:

displaying interactive prompt information on the live interface, wherein the interactive prompt information is used for prompting an interaction progress corresponding to the preset interaction operation.

10. The method according to claim 9, wherein the interactive prompt information comprises:

an interactive prompt progress bar, a filling progress of which corresponds to a receiving duration of the preset interaction operation.

11. The method according to claim 10, wherein the interactive prompt progress bar comprises: at least one of interactive copywriting information or interactive icon information.

12. The method according to claim 1, wherein the live interface is a live interface corresponding to a current object, and the method further comprises:

determining a first display position of object information corresponding to the current object on the interactive image; and highlighting object avatar information corresponding to the first display position on the interactive image.

13. The method according to claim 1, wherein the live interface is a live interface corresponding to a current object, and the method further comprises:

determining a second display position selected by the current object on the interactive image; and displaying object information of the current object at the second display position.

14. The method according to claim 1, further comprising at least one of:

in response to a save operation on the interactive image, performing storage processing for the interactive image; or in response to a share operation on the interactive image, displaying a sharing page corresponding to the interactive image.

15. An electronic device, comprising:

a processor; and a memory configured to store instructions executable by the processor;

the processor being configured to read the executable instructions from the memory and execute the executable instructions to implement a live interaction method comprising:

receiving a preset interaction operation on a live interface of a live streaming;

in response to the preset interaction operation meeting a preset condition, triggering a generation of an interactive image based on object information associated with the live streaming; and displaying the interactive image on the live interface, wherein the object information comprises object avatar information, the generation of the interactive image based on the object information associated with the live streaming comprises:

acquiring an interactive image template corresponding to streamer information of the live streaming, wherein the interactive image template comprises a plurality of avatar display areas; and displaying the object avatar information in the plurality of avatar display areas to generate the interactive image, and the displaying the object avatar information in the plurality of avatar display areas to generate the interactive image comprises:

determining a first number of the object avatar information and a second number of the plurality of avatar display areas;

in response to the first number being less than or equal to the second number, displaying the first number of the object avatar information in the plurality of avatar display areas; and determining an idle avatar display area in which the object avatar information is not displayed, and displaying a preset template avatar in the idle avatar display area to generate the interactive image.

16. The electronic device according to claim 15, wherein the preset interaction operation comprises at least one of like operation, comment operation, or share operation.

17. A non-transitory computer-readable storage medium having stored thereon a computer program, for performing a live interaction method comprising:

receiving a preset interaction operation on a live interface of a live streaming;

in response to the preset interaction operation meeting a preset condition, triggering a generation of an interactive image based on object information associated with the live streaming; and displaying the interactive image on the live interface, wherein the object information comprises object avatar information, the generation of the interactive image based on the object information associated with the live streaming comprises:

acquiring an interactive image template corresponding to streamer information of the live streaming, wherein the interactive image template comprises a plurality of avatar display areas; and displaying the object avatar information in the plurality of avatar display areas to generate the interactive image, and the displaying the object avatar information in the plurality of avatar display areas to generate the interactive image comprises:

determining a first number of the object avatar information and a second number of the plurality of avatar display areas;

in response to the first number being less than or equal to the second number, displaying the first number of the object avatar information in the plurality of avatar display areas; and determining an idle avatar display area in which the object avatar information is not displayed, and displaying a preset template avatar in the idle avatar display area to generate the interactive image.

* * * * *